US012341614B2

(12) United States Patent
Ganesan et al.

(10) Patent No.: US 12,341,614 B2
(45) Date of Patent: Jun. 24, 2025

(54) CODEBOOK CONFIGURATION FOR HARQ REPORTING

(71) Applicant: Lenovo (Singapore) PTE. LTD., New Tech Park (SG)

(72) Inventors: Karthikeyan Ganesan, Kronberg im Taunus (DE); Alexander Johann Maria Golitschek Edler von Elbwart, Darmstadt (DE); Ankit Bhamri, Rödermark (DE); Ali Ramadan Ali, Munich (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 345 days.

(21) Appl. No.: 17/923,352

(22) PCT Filed: Apr. 29, 2021

(86) PCT No.: PCT/IB2021/053559
§ 371 (c)(1),
(2) Date: Nov. 4, 2022

(87) PCT Pub. No.: WO2021/224730
PCT Pub. Date: Nov. 11, 2021

(65) Prior Publication Data
US 2023/0198680 A1 Jun. 22, 2023

Related U.S. Application Data

(60) Provisional application No. 63/019,858, filed on May 4, 2020.

(51) Int. Cl.
*H04L 1/1822* (2023.01)
*H04L 1/1812* (2023.01)

(52) U.S. Cl.
CPC .......... *H04L 1/1822* (2013.01); *H04L 1/1812* (2013.01)

(58) Field of Classification Search
None
See application file for complete search history.

(56) References Cited

U.S. PATENT DOCUMENTS

2019/0356456 A1\* 11/2019 Park ...................... H04L 1/1887
2020/0228248 A1\* 7/2020 Islam .................... H04L 5/0055
(Continued)

FOREIGN PATENT DOCUMENTS

WO 2020033395 A1 2/2020

OTHER PUBLICATIONS

PCT/IB2021/053559, "Notification of Transmittal of the International Search Report and the Written Opinion of the International Searching Authority, or the Declaration", International Searching Authority, Jul. 19, 2021, pp. 1-14.
(Continued)

*Primary Examiner* — Hong S Cho
(74) *Attorney, Agent, or Firm* — Kunzler Bean & Adamson (57) ABSTRACT

Apparatuses, methods, and systems are disclosed for codebook configuration for HARQ reporting. One method includes receiving a plurality of codebook configurations, wherein each codebook configuration of the plurality of codebook configurations comprises information indicating a subset of a total hybrid automatic repeat request process for a hybrid automatic repeat request report. The method includes autonomously selecting a codebook configuration of the plurality of codebook configurations. The method includes transmitting information indicating the selected codebook configuration in configured grant uplink control information, a physical uplink shared channel transmission,
(Continued)

or a combination thereof. The method includes generating the hybrid automatic repeat request report for the subset of the total hybrid automatic repeat request process according to the selected codebook configuration.

20 Claims, 6 Drawing Sheets

(56) References Cited

U.S. PATENT DOCUMENTS

2020/0295810 A1* 9/2020 Baldemair ............ H04L 1/1864
2021/0152293 A1* 5/2021 Hosseini ............... H04L 1/1854

OTHER PUBLICATIONS

Huawei, "Feature lead summary of HARQ enhancements for NR-U", 3GPP TSG RAN WG1 Meeting #96bis R1-1905649, Apr. 8-12, 2019, pp. 1-29.
Qualcomm Inc., "Enhancements to Scheduling and HARQ operation for NR-U", 3GPP TSG RAN WG1 Meeting #96b R1-1905001, Apr. 8-12, 2019, pp. 1-13.

* cited by examiner

| 00 | UL-SCH TB data only |
|----|---------------------|
| 01 | HARQ-ACK report, no CSI report and UL-SCH TB data |
| 10 | No HARQ-ACK report, CSI report and UL-SCH TB data |
| 11 | HARQ-ACK report, CSI report and UL-SCH TB data |

| 00 | UL-SCH TB data only |
|----|---------------------|
| 01 | HARQ-ACK report and UL-SCH TB data |

| 00 | UL-SCH TB data only |
|----|---------------------|
| 01 | CSI report and UL-SCH TB data |

CODEBOOK CONFIGURATION FOR HARQ REPORTING

CROSS-REFERENCE TO RELATED APPLICATIONS

This application claims priority to U.S. Patent Application Ser. No. 63/019,858 entitled "APPARATUSES, METHODS, AND SYSTEMS FOR AUTONOMOUS REPORTING OF UCI INFORMATION IN A CG UL RESOURCE" and filed on May 4, 2020 for Karthikeyan Ganesan, which is incorporated herein by reference in its entirety.

FIELD

The subject matter disclosed herein relates generally to wireless communications and more particularly relates to codebook configuration for HARQ reporting.

BACKGROUND

In certain wireless communications networks, HARQ reporting may be used. In such networks, a HARQ report may be sent later than desired.

BRIEF SUMMARY

Methods for codebook configuration for HARQ reporting are disclosed. Apparatuses and systems also perform the functions of the methods. One embodiment of a method includes receiving a plurality of codebook configurations, wherein each codebook configuration of the plurality of codebook configurations comprises information indicating a subset of a total hybrid automatic repeat request process for a hybrid automatic repeat request report. In some embodiments, the method includes autonomously selecting a codebook configuration of the plurality of codebook configurations. In certain embodiments, the method includes transmitting information indicating the selected codebook configuration in configured grant uplink control information, a physical uplink shared channel transmission, or a combination thereof. In various embodiments, the method includes generating the hybrid automatic repeat request report for the subset of the total hybrid automatic repeat request process according to the selected codebook configuration.

One apparatus for codebook configuration for HARQ reporting includes a receiver that receives a plurality of codebook configurations, wherein each codebook configuration of the plurality of codebook configurations comprises information indicating a subset of a total hybrid automatic repeat request process for a hybrid automatic repeat request report. In various embodiments, the apparatus includes a processor that autonomously selects a codebook configuration of the plurality of codebook configurations. In certain embodiments, the apparatus includes a transmitter that transmits information indicating the selected codebook configuration in configured grant uplink control information, a physical uplink shared channel transmission, or a combination thereof. In some embodiments, the processor generates the hybrid automatic repeat request report for the subset of the total hybrid automatic repeat request process according to the selected codebook configuration.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
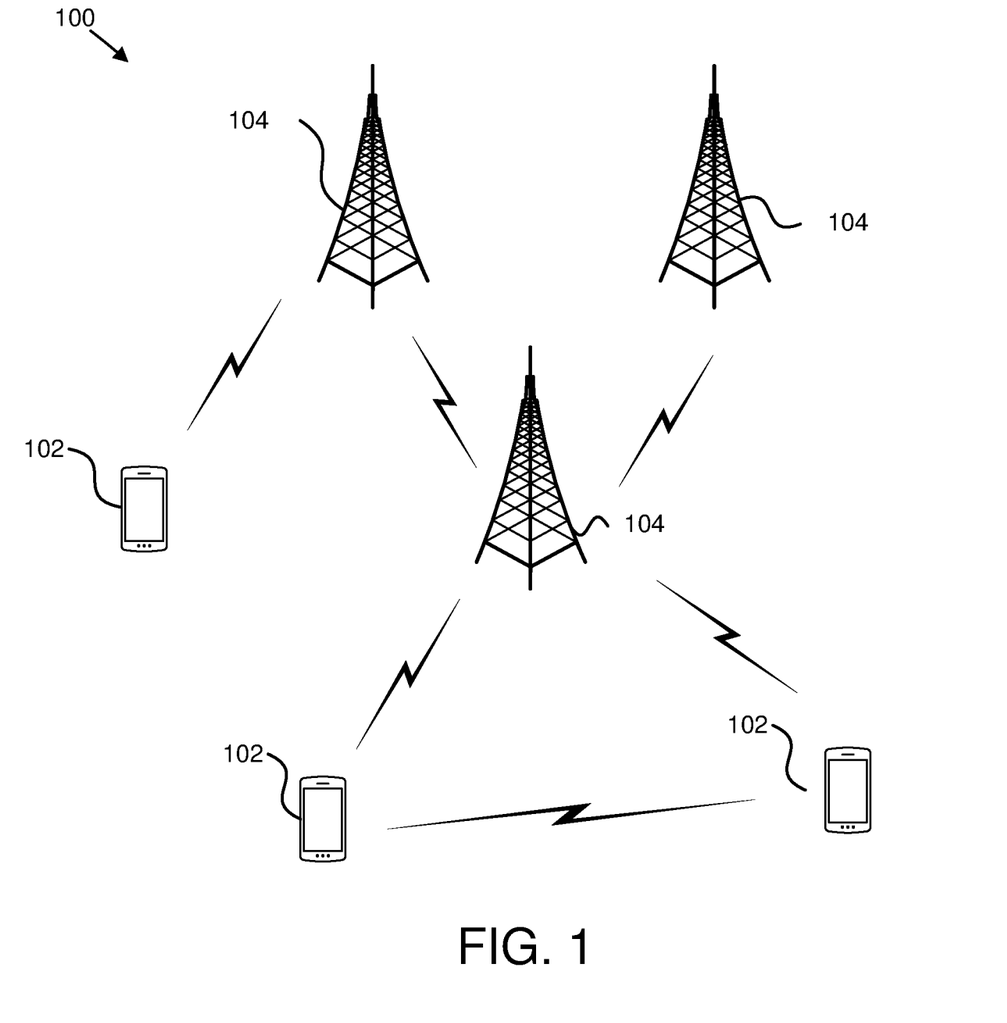
FIG. 1 is a schematic block diagram illustrating one embodiment of a wireless communication system for codebook configuration for HARQ reporting.

FIG. 1 depicts an embodiment of a wireless communication system 100 for codebook configuration for HARQ reporting. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive a plurality of codebook configurations, wherein each codebook configuration of the plurality of codebook configurations comprises information indicating a subset of a total hybrid automatic repeat request process for a hybrid automatic repeat request report. In some embodiments, the remote unit 102 may autonomously select a codebook configuration of the plurality of codebook configurations. In certain embodiments, the remote unit 102 may transmit information indicating the selected codebook configuration in configured grant uplink control information, a physical uplink shared channel transmission, or a combination thereof. In various embodiments, the remote unit 102 may generate the hybrid automatic repeat request report for the subset of the total hybrid automatic repeat request process according to the selected codebook configuration. Accordingly, the remote unit 102 may be used for codebook configuration for HARQ reporting.

Figure 2:
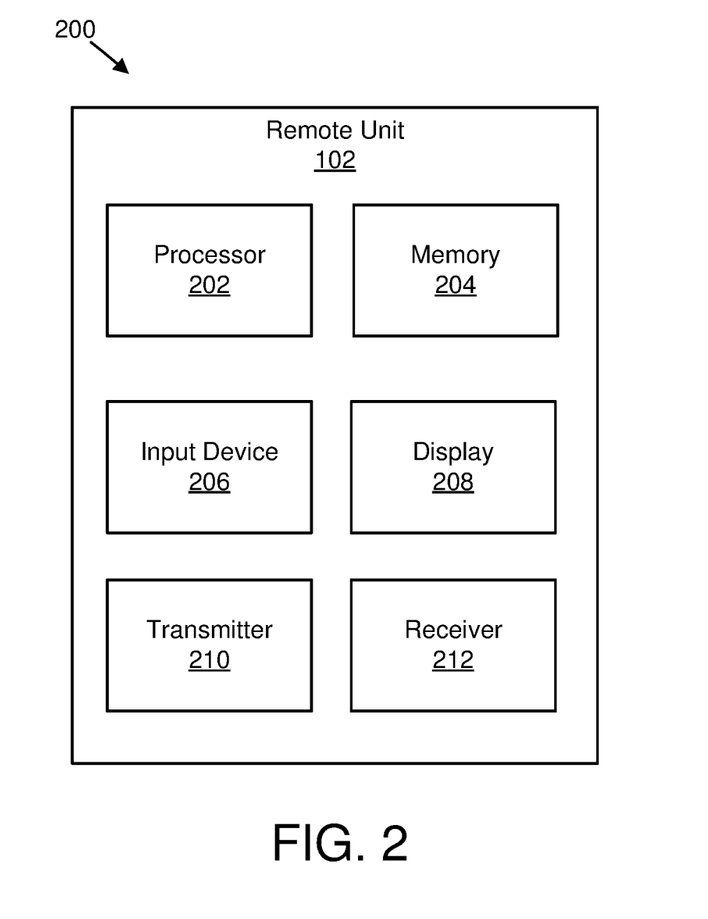
FIG. 2 is a schematic block diagram illustrating one embodiment of an apparatus that may be used for codebook configuration for HARQ reporting.

FIG. 2 depicts one embodiment of an apparatus 200 that may be used for codebook configuration for HARQ reporting. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives a plurality of codebook configurations, wherein each codebook configuration of the plurality of codebook configurations comprises information indicating a subset of a total hybrid automatic repeat request process for a hybrid automatic repeat request report. In various embodiments, the processor 202 autonomously selects a codebook configuration of the plurality of codebook configurations. In certain embodiments, the transmitter 210 transmits information indicating the selected codebook configuration in configured grant uplink control information, a physical uplink shared channel transmission, or a combination thereof. In some embodiments, the processor 202 generates the hybrid automatic repeat request report for the subset of the total hybrid automatic repeat request process according to the selected codebook configuration.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
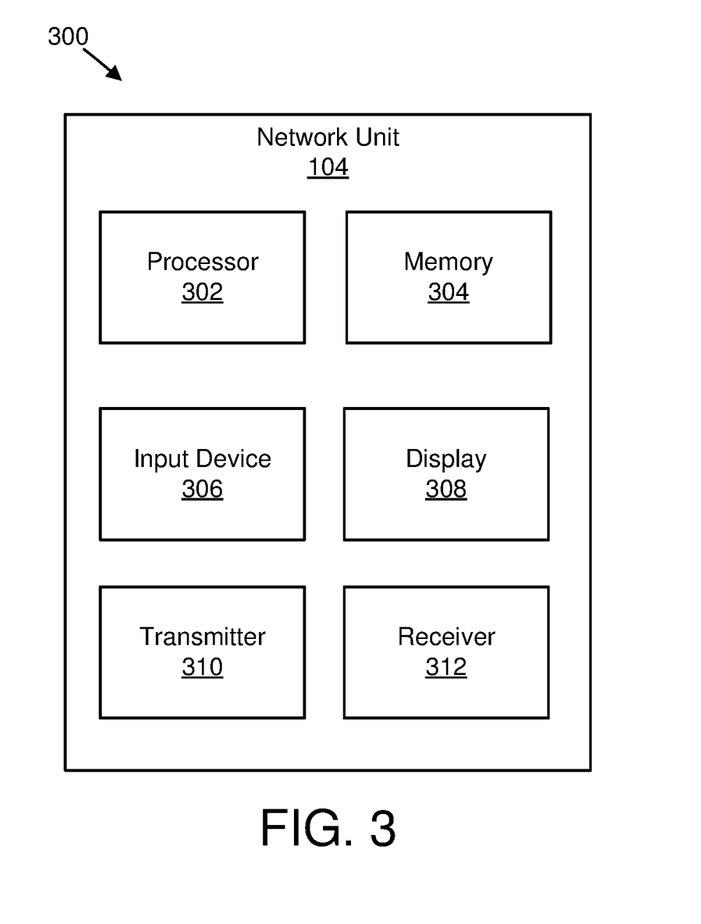
FIG. 3 is a schematic block diagram illustrating one embodiment of an apparatus that may be used for codebook configuration for HARQ reporting.

FIG. 3 depicts one embodiment of an apparatus 300 that may be used for codebook configuration for HARQ reporting. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, a channel access mechanism for physical uplink control channel ("PUCCH") is with category 4 ("Cat 4") listen-before-talk ("LBT") and LBT failure during a PUCCH transmit occasion may delay transmission of a hybrid automatic repeat request acknowledgment ("HARQ-ACK") report and/or a channel state information ("CSI") report to a gNB. In some embodiments, aperiodic and/or autonomous reporting of uplink control information ("UCI") like a HARQ-ACK report and/or a CSI report multiplexed with an uplink ("UL") shared channel ("SCH") transport block ("TB") in a configured grant ("CG") UL-resource.

In certain embodiments, a user equipment ("UE") may encounter LBT failure in one or more beams configured for PUCCH transmissions. The LBT failure may prevent (e.g., block, inhibit) the UE from transmitting a HARQ-ACK report and/or a CSI report until the next PUCCH opportunity. In such embodiments, if there is a CG resource before the next PUCCH opportunity, the UE may transmit a HARQ-ACK report and/or a CSI report in the CG resource instead of an UL-SCH if there is no UL data to be transmitted or multiplexed along with the transport block.

In various embodiments, a UE may autonomously use a CG resource for reporting HARQ-ACK feedback and/or a CSI report based on a maximum allowed time duration of delaying the HARQ-ACK feedback and/or the CSI report where the maximum allowed time duration is defined as time slots that may be configured by radio resource control ("RRC") signaling. In some embodiments, the maximum allowed time duration of delaying HARQ-ACK feedbacks may be derived based on a latency requirement of traffic or based on a survival time for industrial internet of things ("IIoT") and/or ultra-reliable low-latency communication ("URLLC"). For example, at an expected time for PUCCH, if LBT fails, then there are no further UL transmissions scheduled until there is a configured grant uplink ("CG-UL") resource. In this example, the HARQ-ACK feedback may be multiplexed in that CG-UL depending on a maximum allowed time duration of delaying HARQ-ACK feedbacks. In another example, if the HARQ-ACK feedback transmission indicates the non-numeric value for K1 ("NNK1"), which means a minimum time until a next CG-UL resource. The hybrid automatic repeat request ("HARQ") feedback report may be dropped if the UE is not able to find a CG UL resource or next CG UL resource outside of the maximum allowed time duration or NNK1.

In certain embodiments, one or more bits may be introduced in configured grant uplink control information ("CG-UCI") to inform a gNB to distinguish a CG resource multiplexing a HARQ-ACK report and/or a CSI report along with an uplink shared channel ("UL-SCH") transport block. In one embodiment, a HARQ-ACK report and/or a CSI report are multiplexed along with the UL transport block transmission. In another embodiment, a HARQ-ACK report and/or a CSI report are transmitted without an UL transport block, if there is no UL data. In various embodiments, if there is any UL-SCH data for transmission on CG resources, but if it has a lower priority than the HARQ-ACK report or the CSI report, then transmission of that UL-SCH data may be delayed. This may mean that only the HARQ-ACK report and/or the CSI report is transmitted on the CG resource, but not UL-SCH data. The interpretation of a code point (e.g., information, such as one or more bits, that indicate what is included in the CG resource) in CG-UCI may be configured by RRC signaling.

Figure 4:
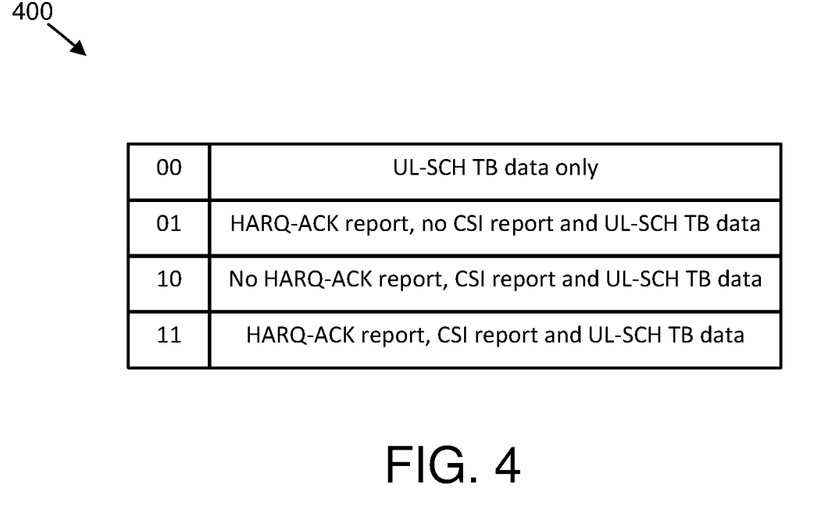
FIG. 4 is a schematic block diagram illustrating one embodiment of a codepoint in CG-UCI configured by RRC.

FIG. 4 is a schematic block diagram 400 illustrating one embodiment of a codepoint in CG-UCI configured by RRC having a bitfield (e.g., column 1 of FIG. 4, 00, 01, 10, 11) that indicates what is transmitted on a CG resource (e.g., column 2 of FIG. 4). If this codepoint (e.g., bitfield) is not transmitted, then only UL-SCH TB data is expected by a gNB on CG resources.

Figure 5:
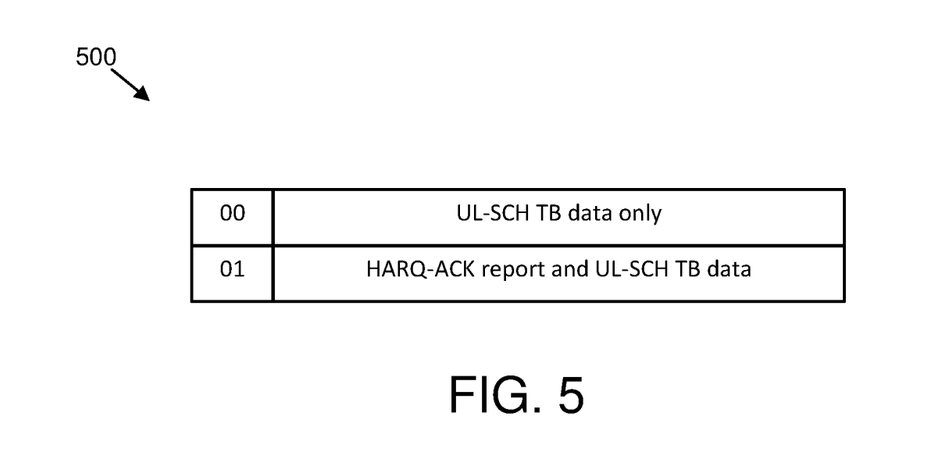
FIG. 5 is a schematic block diagram illustrating another embodiment of a codepoint in CG-UCI configured by RRC.

FIG. 5 is a schematic block diagram 500 illustrating another embodiment of a codepoint in CG-UCI configured by RRC having a bitfield (e.g., column 1 of FIG. 5, 00, 01) that indicates what is transmitted on a CG resource (e.g., column 2 of FIG. 5).

Figure 6:
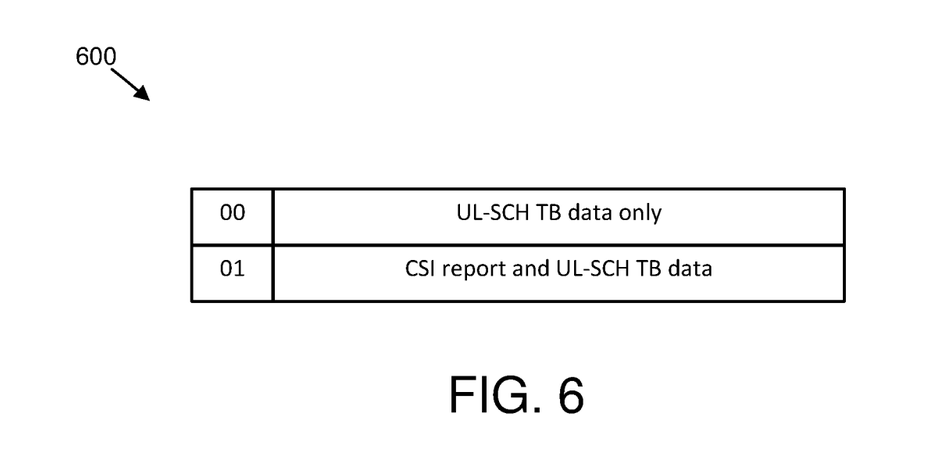
FIG. 6 is a schematic block diagram illustrating another embodiment of a codepoint in CG-UCI configured by RRC.

FIG. 6 is a schematic block diagram 600 illustrating another embodiment of a codepoint in CG-UCI configured by RRC having a bitfield (e.g., column 1 of FIG. 6, 00, 01) that indicates what is transmitted on a CG resource (e.g., column 2 of FIG. 6).

In some embodiments, an amount of resources (e.g., resource elements ("REs")) used by HARQ-ACK feedback (e.g., HARQ-ACK report) and/or a CSI report in CG-UL resource if multiplexed with UL-SCH data may be determined based on a beta-offset value. In such embodiments, RRC signaling may configure the beta-offset value for multiplexing the HARQ-ACK feedback and/or the CSI report with UL-SCH data in the CG resource. In certain embodiments, RRC signaling configures a set of beta-offset values for multiplexing HARQ-ACK feedback and/or a CSI report with UL-SCH data in a CG resource and an actual value used by a UE may be signaled in CG-UCI. In various embodiments, one codepoint or invalid codepoint of a beta offset may indicate the absence of UL-SCH data in a CG resource. In some embodiments, different formats and/or sizes for CG-UCI may be configured by RRC signaling for a CG-UL resource in which a content of the CG-UCI is configurable by RRC signaling.

In various embodiments, a UE may transmit a HARQ-ACK report for all HARQ processes while transmitting the HARQ-ACK report in a CG resource. In such embodiments, HARQ-ACK reports corresponding to all HARQ processes are generated based on an ascending order of HARQ process identifiers ("IDs"). In certain embodiments, a gNB may assume that a UE reports HARQ-ACK feedback for all HARQ process IDs.

In some embodiments, a UE may autonomously select a subset of HARQ processes for reporting a HARQ-ACK report, and the selected HARQ process IDs in the subset of HARQ processes may be included in the HARQ-ACK report. In various embodiments, a UE may indicate using a bit in CG-UCI that the UE is autonomously reporting HARQ-ACK reports only from a subset of HARQ processes or RRC signaling may configure whether all HARQ processes or a subset of total HARQ processes are to be used for UCI reporting on a CG resource. In one implementation, each code book configuration includes rules containing a subset of HARQ processes for one or more serving cells.

In certain embodiments, a UE may include HARQ process IDs followed by corresponding HARQ-ACK reports in a CG resource.

In some embodiments, a UE may be configured with the usage of a semi-static or a dynamic code book used for generating HARQ-ACK feedback to be transmitted in a CG resource by RRC signaling or such a configuration may be dynamically indicated by the UE in CG-UCI.

In various embodiments, if a gNB expects to detect a PUCCH transmission but cannot (e.g., due to LBT failure), instead of using a codepoint in CG-UCI to indicate whether an UCI type and/or UL-SCH TB data is transmitted, a default case of transmitting only UCI on a first available CG resources may be assumed. In such embodiments, the gNB may expect to receive corresponding UCI on next available CG resources configured to the UE without any explicit indication in CG-UCI.

As may be appreciated, various embodiments may be described in relation to an un-licensed or shared spectrum; however, any embodiments described herein may be applicable to a licensed carrier for IIoT communications and/or URLLC.

In certain embodiments, for IIoT communications and/or URLLC, if PUCCH resources are not available to transmit a HARQ-ACK report and/or a CSI report within latency constraints of a service type, then CG resources may be used for transmitting the HARQ-ACK report and/or the CSI report to satisfy low-latency requirements or a survival time. In some embodiments, a UE may report HARQ-ACK and/or CSI in a next CG-UL resource if the UE did not decode a previous DL TB or consecutive decoding failure for a DL TB. In another embodiment, a HARQ ACK report and/or a CSI report may transmitted in CG-UCI.

Figure 7:
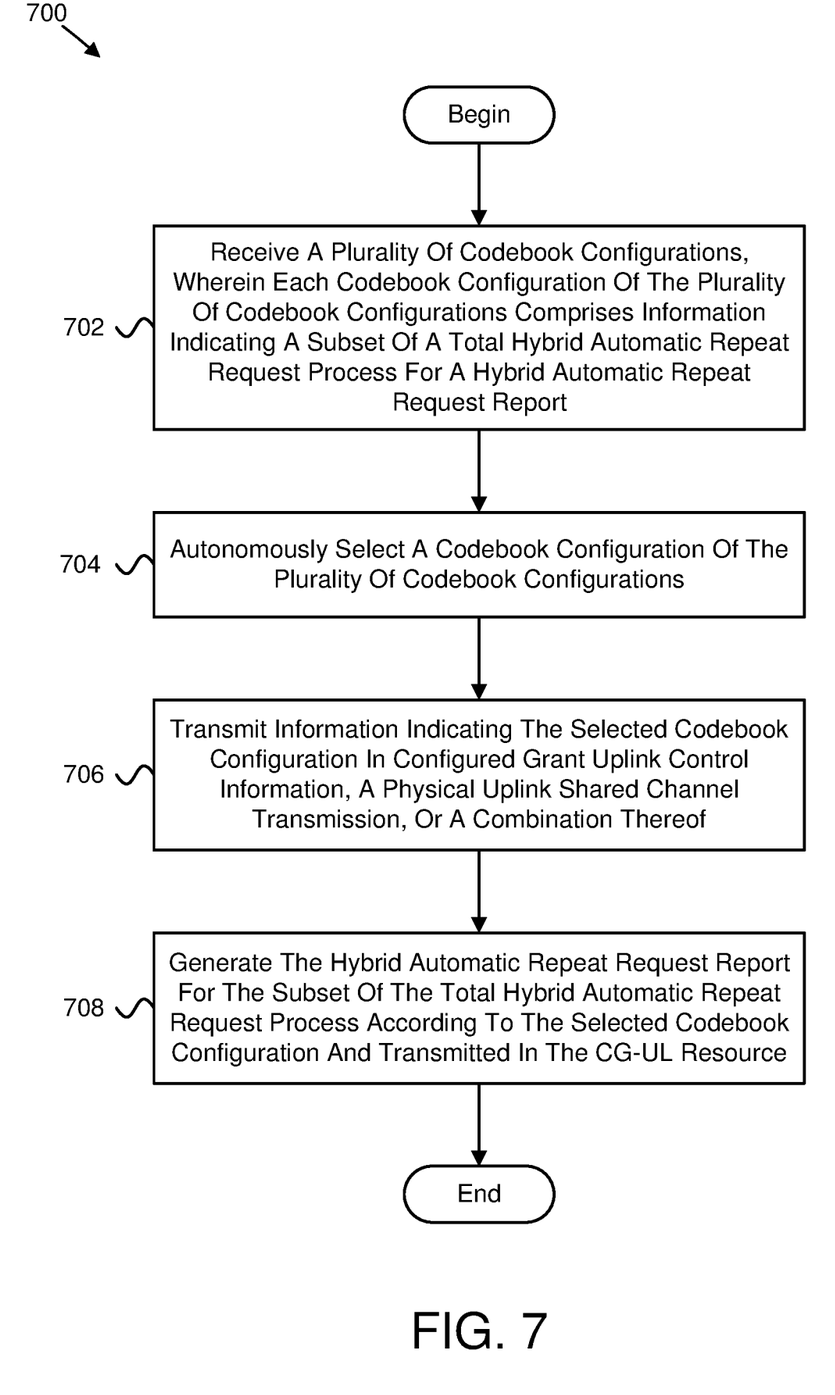
FIG. 7 is a flow chart diagram illustrating one embodiment of a method for codebook configuration for HARQ reporting.

FIG. 7 is a flow chart diagram illustrating one embodiment of a method 700 for codebook configuration for HARQ reporting. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes receiving 702 a plurality of codebook configurations, wherein each codebook configuration of the plurality of codebook configurations comprises information indicating a subset of a total hybrid automatic repeat request process for a hybrid automatic repeat request report. In some embodiments, the method 700 includes autonomously selecting 704 a codebook configuration of the plurality of codebook configurations. In certain embodiments, the method 700 includes transmitting 706 information indicating the selected codebook configuration in configured grant uplink control information, a physical uplink shared channel transmission, or a combination thereof. In various embodiments, the method 700 includes generating 708 the hybrid automatic repeat request report for the subset of the total hybrid automatic repeat request process according to the selected codebook configuration and transmitted in the CG-UL resource.

In certain embodiments, receiving the plurality of codebook configurations comprises receiving the plurality of codebook configurations via radio resource control signaling. In some embodiments, the method 700 further comprises determining the reporting of the hybrid automatic repeat request report in response to a physical uplink control channel not being transmitted in a first available configured grant uplink resource. In various embodiments, transmission of the hybrid automatic repeat request report in the configured grant uplink resource according to a maximum allowed time duration is in terms of a time slot for delaying transmitting the hybrid automatic repeat request report.

In one embodiment, the configured grant uplink control information comprises an indicator that indicates whether only an uplink shared channel transport block is included, if the uplink shared channel transport block is multiplexed with the hybrid automatic repeat request report or the channel state information report, or a combination thereof. In certain embodiments, in response to a physical uplink control channel transmission not being transmitted, a default contents of the configured grant uplink control information is the hybrid automatic repeat request report in a first available configured grant resource. In some embodiments, the method 700 further comprises determining whether to transmit all hybrid automatic repeat requests for all hybrid automatic repeat request process identifiers by default.

In various embodiments, the method 700 further comprises determining radio resource control signaling corresponding to a beta-offset value for multiplexing the hybrid automatic repeat request report, a channel state information report, or the combination thereof with an uplink shared channel transport block. In one embodiment, autonomously selecting the codebook configuration of the plurality of codebook configurations comprises autonomously selecting the codebook configuration of the plurality of codebook configurations in response to a physical uplink control channel not being transmitted (e.g., triggered if a PUCCH channel is not transmitted) due to a listen-before-talk failure in listen-before-talk unlicensed communication or in response to a hybrid automatic repeat request report not being transmitted (e.g., triggered if a particular HARQ-ACK report is dropped in PUCCH because PUCCH is assigned to carry high priority HARQ-ACK reports) in a physical uplink control channel due to prioritization in industrial internet of things communication, ultra-reliable low-latency communication, or a combination thereof.

In certain embodiments, the method 700 further comprises receiving configuration information for the configured grant uplink control information via radio resource control signaling. In some embodiments, the method 700 further comprises ordered hybrid automatic repeat request processes according to an ascending order of hybrid automatic repeat request process identifiers and corresponding serving cells. In various embodiments, the method 700 further comprises determining transmission of a channel state information report in response to a physical uplink control channel not being transmitted in a first available configured grant uplink resource.

In one embodiment, the method 700 further comprises determining that autonomously reporting the channel state information report in the configured grant uplink resource depends on a maximum allowed time duration. In certain embodiments, the maximum allowed time duration is in terms of a time slot for delaying transmitting the channel state information report. In some embodiments, in response to a physical uplink control channel transmission not being transmitted, a default contents of the configured grant uplink control information is the channel state information report in a first available configured grant resource.

In one embodiment, a method comprises: receiving a plurality of codebook configurations, wherein each codebook configuration of the plurality of codebook configurations comprises information indicating a subset of a total hybrid automatic repeat request process for a hybrid automatic repeat request report; autonomously selecting a codebook configuration of the plurality of codebook configurations; transmitting information indicating the selected codebook configuration in configured grant uplink control information, a physical uplink shared channel transmission, or a combination thereof; and generating the hybrid automatic repeat request report for the subset of the total hybrid automatic repeat request process according to the selected codebook configuration.

In certain embodiments, receiving the plurality of codebook configurations comprises receiving the plurality of codebook configurations via radio resource control signaling.

In some embodiments, the method further comprises determining the reporting of the hybrid automatic repeat request report in response to a physical uplink control channel not being transmitted in a first available configured grant uplink resource.

In various embodiments, transmission of the hybrid automatic repeat request report in the configured grant uplink resource according to a maximum allowed time duration is in terms of a time slot for delaying transmitting the hybrid automatic repeat request report.

In one embodiment, the configured grant uplink control information comprises an indicator that indicates whether only an uplink shared channel transport block is included, if the uplink shared channel transport block is multiplexed with the hybrid automatic repeat request report or the channel state information report, or a combination thereof.

In certain embodiments, in response to a physical uplink control channel transmission not being transmitted, a default contents of the configured grant uplink control information is the hybrid automatic repeat request report in a first available configured grant resource.

In some embodiments, the method further comprises determining whether to transmit all hybrid automatic repeat requests for all hybrid automatic repeat request process identifiers by default.

In various embodiments, the method further comprises determining radio resource control signaling corresponding to a beta-offset value for multiplexing the hybrid automatic repeat request report, a channel state information report, or the combination thereof with an uplink shared channel transport block.

In one embodiment, autonomously selecting the codebook configuration of the plurality of codebook configurations comprises autonomously selecting the codebook configuration of the plurality of codebook configurations in response to a physical uplink control channel not being transmitted due to a listen-before-talk failure in listen-before-talk unlicensed communication or in response to a hybrid automatic repeat request report not being transmitted in a physical uplink control channel due to prioritization in industrial internet of things communication, ultra-reliable low-latency communication, or a combination thereof.

In certain embodiments, the method further comprises receiving configuration information for the configured grant uplink control information via radio resource control signaling.

In some embodiments, the method further comprises ordered hybrid automatic repeat request processes according to an ascending order of hybrid automatic repeat request process identifiers and corresponding serving cells.

In various embodiments, the method further comprises determining transmission of a channel state information report in response to a physical uplink control channel not being transmitted in a first available configured grant uplink resource.

In one embodiment, the method further comprises determining that autonomously reporting the channel state information report in the configured grant uplink resource depends on a maximum allowed time duration.

In certain embodiments, the maximum allowed time duration is in terms of a time slot for delaying transmitting the channel state information report.

In some embodiments, in response to a physical uplink control channel transmission not being transmitted, a default contents of the configured grant uplink control information is the channel state information report in a first available configured grant resource.

In one embodiment, an apparatus comprises: a receiver that receives a plurality of codebook configurations, wherein each codebook configuration of the plurality of codebook configurations comprises information indicating a subset of a total hybrid automatic repeat request process for a hybrid automatic repeat request report; a processor that autonomously selects a codebook configuration of the plurality of codebook configurations; and a transmitter that transmits information indicating the selected codebook configuration in configured grant uplink control information, a physical uplink shared channel transmission, or a combination thereof; wherein the processor generates the hybrid automatic repeat request report for the subset of the total hybrid automatic repeat request process according to the selected codebook configuration.

In certain embodiments, the receiver receiving the plurality of codebook configurations comprises the receiver receiving the plurality of codebook configurations via radio resource control signaling.

In some embodiments, the processor determines the reporting of the hybrid automatic repeat request report in response to a physical uplink control channel not being transmitted in a first available configured grant uplink resource.

In various embodiments, transmission of the hybrid automatic repeat request report in the configured grant uplink resource according to a maximum allowed time duration is in terms of a time slot for delaying transmitting the hybrid automatic repeat request report.

In one embodiment, the configured grant uplink control information comprises an indicator that indicates whether only an uplink shared channel transport block is included, if the uplink shared channel transport block is multiplexed with the hybrid automatic repeat request report or the channel state information report, or a combination thereof.

In certain embodiments, in response to a physical uplink control channel transmission not being transmitted, a default contents of the configured grant uplink control information is the hybrid automatic repeat request report in a first available configured grant resource.

In some embodiments, the processor determines whether to transmit all hybrid automatic repeat requests for all hybrid automatic repeat request process identifiers by default.

In various embodiments, the processor determines radio resource control signaling corresponding to a beta-offset value for multiplexing the hybrid automatic repeat request report, a channel state information report, or the combination thereof with an uplink shared channel transport block.

In one embodiment, autonomously selecting the codebook configuration of the plurality of codebook configurations comprises autonomously selecting the codebook configuration of the plurality of codebook configurations in response to a physical uplink control channel not being transmitted due to a listen-before-talk failure in listen-before-talk unlicensed communication or in response to a hybrid automatic repeat request report not being transmitted in a physical uplink control channel due to prioritization in industrial internet of things communication, ultra-reliable low-latency communication, or a combination thereof.

In certain embodiments, the receiver receives configuration information for the configured grant uplink control information via radio resource control signaling.

In some embodiments, the processor orders hybrid automatic repeat request processes according to an ascending order of hybrid automatic repeat request process identifiers and corresponding serving cells.

In various embodiments, the processor determines transmission of a channel state information report in response to a physical uplink control channel not being transmitted in a first available configured grant uplink resource.

In one embodiment, the processor determines that autonomously reporting the channel state information report in the configured grant uplink resource depends on a maximum allowed time duration.

In certain embodiments, the maximum allowed time duration is in terms of a time slot for delaying transmitting the channel state information report.

In some embodiments, in response to a physical uplink control channel transmission not being transmitted, a default contents of the configured grant uplink control information is the channel state information report in a first available configured grant resource.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   receiving a plurality of codebook configurations, wherein each codebook configuration of the plurality of codebook configurations comprises information indicating a subset of a total hybrid automatic repeat request process for a hybrid automatic repeat request report;
   autonomously selecting a codebook configuration of the plurality of codebook configurations;
   transmitting information indicating the selected codebook configuration in configured grant uplink control information, a physical uplink shared channel transmission, or a combination thereof; and
   generating the hybrid automatic repeat request report for the subset of the total hybrid automatic repeat request process according to the selected codebook configuration.

2. The method of claim 1, wherein receiving the plurality of codebook configurations comprises receiving the plurality of codebook configurations via radio resource control signaling.

3. The method of claim 1, further comprising determining to report the hybrid automatic repeat request report in response to a physical uplink control channel not being transmitted in a first available configured grant uplink resource.

4. The method of claim 3, wherein transmission of the hybrid automatic repeat request report in the first available configured grant uplink resource according to a maximum allowed time duration is in terms of a time slot for delaying transmitting the hybrid automatic repeat request report.

5. The method of claim 1, wherein the configured grant uplink control information comprises an indicator that indicates whether only an uplink shared channel transport block is included, if the uplink shared channel transport block is multiplexed with the hybrid automatic repeat request report or a channel state information report, or a combination thereof.

6. The method of claim 5, wherein, in response to a physical uplink control channel transmission not being transmitted, a default contents of the configured grant uplink control information is the hybrid automatic repeat request report in a first available configured grant resource.

7. The method of claim 6, further comprising determining whether to transmit all hybrid automatic repeat requests for all hybrid automatic repeat request process identifiers by default.

8. The method of claim 1, further comprising determining radio resource control signaling corresponding to a beta-offset value for multiplexing the hybrid automatic repeat request report, a channel state information report, or the combination thereof with an uplink shared channel transport block.

9. The method of claim 1, wherein autonomously selecting the codebook configuration of the plurality of codebook configurations comprises autonomously selecting the codebook configuration of the plurality of codebook configurations in response to a physical uplink control channel not being transmitted due to a listen-before-talk failure in listen-before-talk unlicensed communication or in response to a hybrid automatic repeat request report not being transmitted in a physical uplink control channel due to prioritization in industrial internet of things communication, ultra-reliable low-latency communication, or a combination thereof.

10. The method of claim 1, further comprising receiving configuration information for the configured grant uplink control information via radio resource control signaling.

11. The method of claim 1, further comprising ordered hybrid automatic repeat request processes according to an ascending order of hybrid automatic repeat request process identifiers and corresponding serving cells.

12. The method of claim 1, further comprising determining transmission of a channel state information report in response to a physical uplink control channel not being transmitted in a first available configured grant uplink resource.

13. The method of claim 12, further comprising determining that autonomously reporting the channel state information report in the first available configured grant uplink resource depends on a maximum allowed time duration.

14. The method of claim 13, wherein the maximum allowed time duration is in terms of a time slot for delaying transmitting the channel state information report.

15. The method of claim 12, wherein, in response to a physical uplink control channel transmission not being transmitted, a default contents of the configured grant uplink control information is the channel state information report in a first available configured grant resource.

16. An apparatus comprising:
a receiver that receives a plurality of codebook configurations, wherein each codebook configuration of the plurality of codebook configurations comprises information indicating a subset of a total hybrid automatic repeat request process for a hybrid automatic repeat request report;
a processor that autonomously selects a codebook configuration of the plurality of codebook configurations; and
a transmitter that transmits information indicating the selected codebook configuration in configured grant uplink control information, a physical uplink shared channel transmission, or a combination thereof;
wherein the processor generates the hybrid automatic repeat request report for the subset of the total hybrid automatic repeat request process according to the selected codebook configuration.

17. The apparatus of claim 16, wherein the receiver receiving the plurality of codebook configurations comprises the receiver receiving the plurality of codebook configurations via radio resource control signaling.

18. The apparatus of claim 16, wherein the processor determines to report the hybrid automatic repeat request report in response to a physical uplink control channel not being transmitted in a first available configured grant uplink resource.

19. The apparatus of claim 18, wherein transmission of the hybrid automatic repeat request report in the first available configured grant uplink resource according to a maximum allowed time duration is in terms of a time slot for delaying transmitting the hybrid automatic repeat request report.

20. The apparatus of claim 16, wherein the configured grant uplink control information comprises an indicator that indicates whether only an uplink shared channel transport block is included, if the uplink shared channel transport block is multiplexed with the hybrid automatic repeat request report or a channel state information report, or a combination thereof.

* * * * *